Patented Nov. 11, 1924.

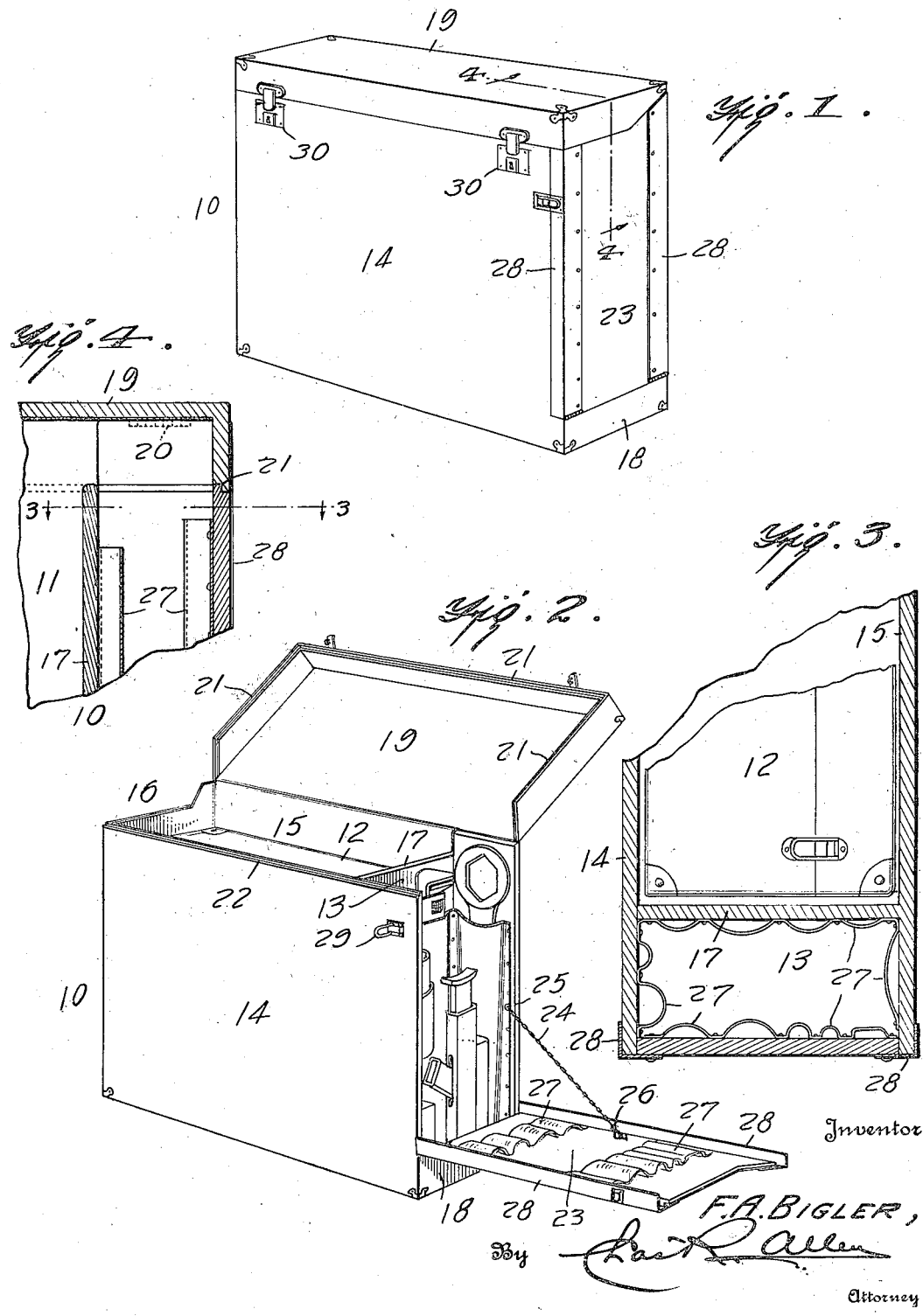

1,514,885

UNITED STATES PATENT OFFICE.

FREDERICK A. BIGLER, OF CHIPPEWA FALLS, WISCONSIN.

MOTOR-VEHICLE TRUNK.

Application filed March 14, 1924. Serial No. 699,307.

*To all whom it may concern:*

Be it known that FREDERICK A. BIGLER, a citizen of the United States, residing at the city of Chippewa Falls, in the county of Chippewa and State of Wisconsin, has invented certain new and useful Improvements in Motor-Vehicle Trunks, of which the following is a specification.

My invention relates to trunks used in connection with motor vehicles and has for an object to provide a very simple, inexpensive and compact accessory that can be readily applied to a motor vehicle, which is indispensable for shopping, touring, picnicking, hunting, and fishing, and, having a handy compartment for tools and work bench, provides a very useful device. The scope of my invention extends to whatever construction may be defined by or included within the appended claim.

In the drawing:

Figure 1 is a view in perspective of my improved automobile trunk, showing it fully closed and locked;

Figure 2 is a similar view, showing the end and top covers opened;

Figure 3 is a horizontal sectional view taken on the line 3—3 of Figure 4 through one end of my improved automobile trunk, and Figure 4 is a detail sectional view through one corner of my device taken on the line 4—4 of Figure 1.

My invention, in form or embodiment shown in the drawing and briefly described, comprises a six-sided trunk 10, the top, bottom, and two ends of which are parallel, and the sides of which may or may not be parallel, which trunk is preferably in use, located immediately adjacent to the rear of the body of the motor vehicle which gives an elongated and attractive appearance to the motor vehicle or located on the running board or elsewhere on the motor vehicle and in any location forms a very useful and indispensable accessory.

The body portion of my trunk 10 may be constructed of wood, veneering, any suitable composition material, leather or metal, or indeed, of a combination of any of these materials.

The trunk 10, briefly stated, comprises a compartment 11 for carrying a suit case 12 or suitcases, bag or bags, box or boxes, basket or baskets, luggage or other desired equipment and a tool carrying compartment 13. The compartment 11, with the exception of its upper end, is completely closed in by means of the front and rear panels 14 and 15, the fixed or stationary end 16 and the partition 17 which is set inwardly from the end 18 so as to provide the tool carrying compartment 13.

A cover 19 is suitably hinged, as at 20, to the rear panel 15 and is provided on its edges with ridges or projections 21, which are adapted to engage when in its closed position with mating grooves 22 which are provided in the upper extremities of the front panel 14 and the end panel 16.

The end 23, in addition to forming an enclosure for the tool compartment 13, also is fitted with a plurality of pockets and provides a very desirable work bench, and is hinged to end 18 slightly above the lowermost edge thereof. To limit the downward movement of the hinged end 23, I provide a chain or stay 24, which is secured to the rear panel as at 25, and likewise is fastened to the end 23 as indicated at 26. The downward movement of the hinged end 23 may also be limited by a projection of a part of the motor vehicle or an attachment thereto. The end 23 is likewise provided with a ridge and groove portion as is the front panel 14 and the end 16. It will thus be readily seen with particular reference to Figures 2 and 4 that when my improved trunk is in its closed position, it will be waterproof and dustproof.

The tool-carrying compartment 13 is provided on its inner walls with suitable pockets 27 of fabric or other suitable material for carrying a complete set of tools, which usually accompany a motor vehicle.

The motorist, therefore, has instant accessibility to any tool desired, which is, of course, snugly fitted within its respective receptacle, and in addition, may use the downwardly swung end 23 as a suitable work bench, which is oftentimes a very desirable adjunct, as for instance, in making quick road side repairs, thereby increasing the efficiency of the operator as well as making repairs and adjustments of this nature more convenient. The various tools and wrenches are supported in their vertical position by means of their own weight in their respective receptacles of fabric 27, or tools may be arranged around the inner wall in other than a vertical position and separated and secured on the walls of compartment 13 by means of clamps, springs, straps, draw cords, wires, or other devices. This arrangement secures the tools firmly without jar or rattle and makes selection of the tool wanted quick and easy.

Angle irons or corners 28 are secured to the hinged end 23 in any suitable manner and are adapted to snugly fit and overlap the front or rear panels 14 and 15, in addition to strengthening the end 23.

When the end 23 is in its closed position I employ a spring latch 29 for more readily holding it in position when the cover 19 is raised for purposes other than the use of the tool compartment 13.

In opening my improved trunk it is, of course, necessary to first, raise the cover 19, because this cover has the additional function of securely holding the end 23 in its closed position, which is accomplished by means of the co-acting ridges and grooves in their adjacent edges.

Locks 30 are suitably secured to the front panel 14 and adapted to engage with mating latch members that are located on the front portion of the cover 19.

What I claim is:

A motor vehicle trunk, comprising stationary front and rear panels, an end wall and a partition wall spaced from one end thereof, providing a tool compartment, a hinged end wall adapted to fit and enclose the tool compartment, a pair of angled plates secured to said hinged end wall adapted to engage the outer sides of said front and rear panels and limit inward movement of said end wall, the upper edges of said end walls and front panel and the co-acting edges of the cover being provided with mating ridges and grooves and a plurality of pockets or other fastening devices for tools arranged within and on all four sides of said tool compartment.

In testimony whereof I affix my signature.

FREDERICK A. BIGLER.